Patented Dec. 5, 1950

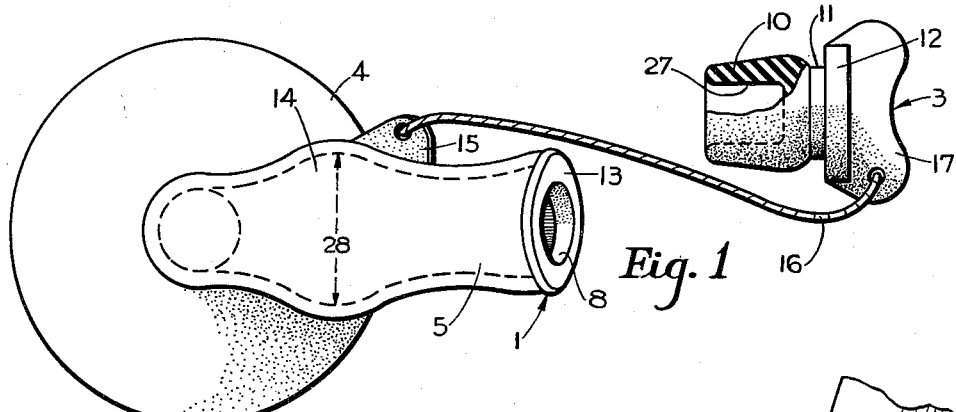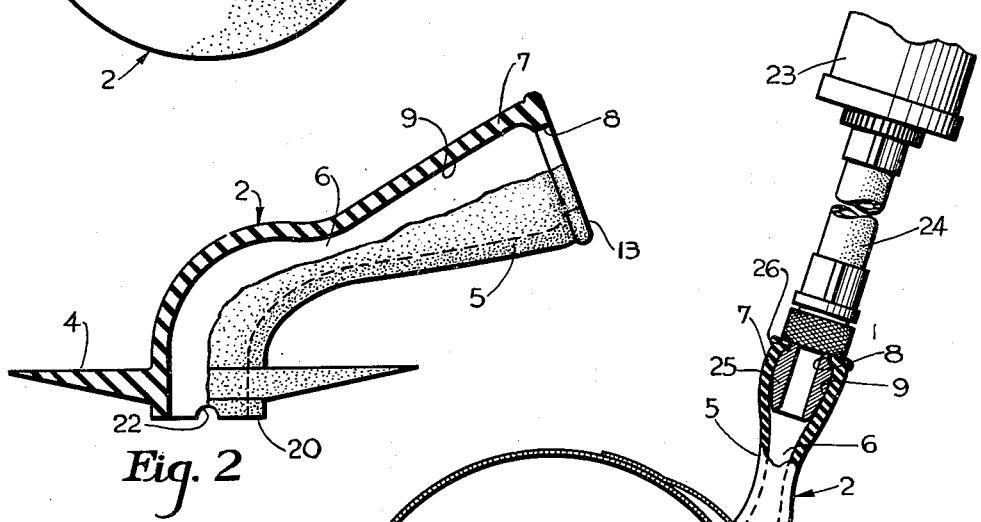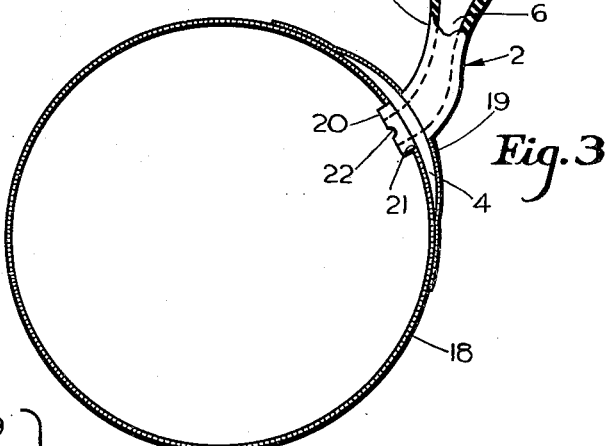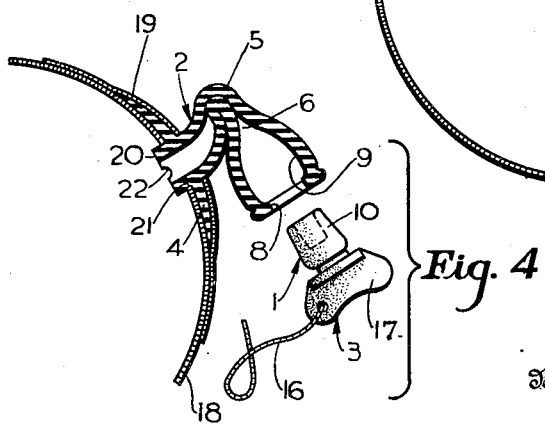

2,533,202

UNITED STATES PATENT OFFICE 2,533,202

INFLATING TUBE ASSEMBLY

Mark J. Sturtevant, Akron, Ohio, assignor to Wingfoot Corporation, Akron, Ohio, a corporation of Delaware Application December 12, 1945, Serial No. 634,532

3 Claims. (Cl. 150—8)

The present invention relates to a novel form of inflating tube assembly for inflatable structures. More particularly, the invention is concerned with an inflating tube structure which can be fabricated in one piece wholly of a flexible plastic material such, for example, as rubber in the form of a hollow tube at one end of which is formed a mounting flange and the other end of which is adapted to receive and provide sealing engagement for an insert such as a plug, or a male adapter fitting such, for example, as that employed on an air pump or other like apparatus.

In the manufacture of inflatable structures of rubberized fabric, including rafts, life boats, pontoons and the like, it is customary to employ conventional valve units which embody a number of interfitting metal parts sealed in various ways with rubber, fiber and the like. One of the more popular types of valves embodies a metal ring mounted in the fabric wall of the inflatable structure having a screw threaded plug which fits into the ring and receives, in turn, a screw threaded adapter or other like fittings.

Experience with such valves under all conditions of exposure, extremes of heat and cold, sand, salt, sea water and the like, has indicated that any valve unit embodying metal-to-metal contact has a tendency to become frozen together by virtue of the effect of the elements on the interfitting parts. Moreover, sand and other foreign matter tends to collect in the screw threads on the valve parts and the valve may become damaged in use to an extent such that the parts thereof are extremely difficult to assemble and disassemble.

It is an object of the present invention to provide a form of inflating tube which may take the place of the conventional type valve and completely eliminates metal parts which are likely to become damaged or so tightly engaged as to be difficult to take apart.

It is a further object of the present invention to provide a form of inflating tube which will insure a positive fluid-tight seal between the parts thereof to eliminate the possibility of leakage.

It is a still further object of the invention to provide a unitary structure of flexible plastic material which will overcome most, if not all, of the difficulties experienced with conventional forms of valve units.

Another object of the invention is to provide a simple type of inflating tube assembly which can be readily and economically manufactured.

Other objects and features of the present invention will be readily apparent as the detailed description of a typical form of inflating tube assembly embodying the teachings of the invention proceeds.

In the accompanying drawings, Figure 1 is a plan view of one form of inflating tube assembly embodying the inventive concept. Figure 2 is a side elevation of the inflating tube with a portion broken away. Figure 3 illustrates the use of an inflating tube on an inflatable structure with parts in section and broken away. Figure 4 is a fragmentary cross section of the inflating tube showing the manner in which it is operated to close the bore until the plug is seated therein.

In Figure 1, the reference character 1 identifies one form of inflating tube assembly embodying the teachings of the present invention and including the inflating tube 2 and a plug 3. The inflating tube 2 is advantageously formed or molded in one piece from a suitable flexible material, such as rubber. The inflating tube 2 comprises a mounting flange 4 formed integrally with a generally tubular portion or stem 5 having a passage 6 extending therethrough.

The cross sectional area of the passage 6 is substantially uniform throughout. At the end of the tubular portion or stem 5 is located a generally cup-shaped seating portion 7 having an annular inwardly projecting lip portion or ring 8 which serves to restrict the open end of the tubular portion. The seating portion 7 is flared outwardly in the area designated by the reference character 9 toward the ring 8. The plug 3 has a butt portion 10 having a peripheral configuration corresponding to that of the internal wall 9 of the seating portion 7 of the tubular portion 5. It is desirable that the butt portion 10 of the plug be slightly larger in cross-sectional circumference throughout its length than the corresponding internal dimensions of the internal wall 9 of the seating portion 7.

Thus, the plug 3 fits tightly against and expands to a slight extent the wall 9 of the seating portion 7. To prevent the plug 3 from being forced out of the seating portion 7, a groove 11 is provided on the plug adjacent the butt portion 10 for interlocking registration with the ring 8 at the open end of the tubular portion 5 of the inflating tube 2. The generally circular flange 12 on the plug 3 seats against the face 13 of the projecting ring 8 when the parts are mated.

The tubular portion 5 of the inflating tube 2 is adapted to be folded or bent back upon itself in the manner shown in Figure 4. To facilitate this operation, the tubular portion 5 is advantageously flattened as at 14 (see Figure 1). This flattened portion 14 of the tubular portion 5 may be formed at any point intermediate the mounting flange 4 and the seating portion 7, however, it is capable of employing the flexibility of the tubular portion most favorably when located substantially equidistant the ends thereof. A tab 15 formed exteriorly of the tubular portion 5 provides a means for attaching the plug 3 as by means of a cord 16 or other suitable connection secured to the wing portion 17 of said plug.

In addition to the oversize relation of the butt portion 10 of the plug 3 with respect to the seating portion 7 of the tubular portion 5, previously described, a recess 27 is formed in the butt portion to provide an enhanced sealing effect. It will be readily understood that the plug 3, by reason of its being slightly larger than the seating portion 7, will have a tendency to distend that part of the wall of the stem 5 upon its insertion therein. The fluid under pressure retained by the plug simultaneously enters the recess 27 and acts to further expand the butt portion of the plug 3 outwardly against the internal wall 9 of the seating portion 7. This operation insures an effective fluid-tight seal.

In use, the inflating tube 2 of the inflating tube assembly 1 is mounted upon the outer wall of the inflatable container 18, being secured thereto as by means of a patch 19 which engages the mounting flange 4. The mounting of the inflating tube 2 is achieved by locating the mounting flange 4 in such a way that the upstanding annular rim 20 integrally formed on the under side of the flange registers with an aperture 21 in the wall of the container 18. The annular rim 20 is advantageously provided with a plurality of notches or semi-circular indentations 22 formed in the edge of the rim 20. The presence of the indentations 22 prevents the inadvertent sealing off of the passage 6 of the tubular portion 5 of the inflating tube by a portion of the wall of the container 18 when it is completely deflated.

The inflation of the container 18 is accomplished by the use of a suitable pump such, for example, as hand pump 23 to which is secured a flexible hose 24 to the end of which is affixed a male fitting 25. The male fitting 25 has an external peripheral configuration corresponding generally to the shape of the butt portion 10 thereby enabling the fitting to cooperate with the internal wall area 9 of the seating portion 7 of the tubular portion 5. A groove 26 is provided on the male fitting 25 for interlocking engagement with the ring 8 on the tubular portion 5 of the inflating tube 2 and temporarily secures the parts together.

It will be understood that the inflatable container 18, which may be a portion of a rubberized fabric boat or the like, is ordinarily originally inflated by one or more cylinders of carbon dioxide under pressure, although it may be wholly air inflated. After the container 18 has been inflated and in use for a period of time, there is some diffusion of the fluid therefrom. This normal diffusion necessitates further inflation of the container by the hand pump 23. With the container 18 inflated the plug 3 of the valve assembly 1 is in place in the inflating tube 2 so that the passage 6 of the tubular portion 5 of said inflating tube is closed.

When it is desired to re-inflate the container 18, the tubular portion 5 of the inflating tube 2 is folded or bent back upon itself at the flattened portion 14 thereof in the manner shown in Figure 4. The plug 3 can then be removed with the passage 6 of the tubular portion 5 pinched shut preparatory to the insertion of the male fitting 25 on the hose 24 of the hand pump 23 therein. After the container 18 has been inflated by the operation of the hand pump 23 to the desired extent, the tubular portion 5 of the inflating tube 2 is again bent back upon itself to close the passage 6 thereof during the removal of the male fitting 25 therefrom. The plug 3 is thereafter put back in place to seal the inflating tube 2 against leakage.

In forming the flattened portion 14 of the tubular portion or stem 5 of the inflating tube 2, the overall length of the uppermost curved inner wall of said flattened portion (represented generally by the reference numeral 28 in Figure 1) must be exactly equal to the corresponding dimension of the lower wall. This relationship is necessary to insure a straight line contact between the upper and lower walls of the flattened portion 14 when the stem 5 is folded over as shown in Figure 4. If any puckers result due to inequalities in the aforementioned dimensions, the inflating tube 2 will be incapable of being pinched shut and the fluid will leak out when the plug 3 is removed.

In inflatable containers having multiple compartmentation, the inflating tube 2, forming part of the inflating tube assembly 1 of the invention, is advantageously adapted to receive one end of a suitable tubular connection (not shown) embodying adapters, such as the male fitting 25, for the purpose of interconnecting similar inflating tubes of adjacent compartments. In this way, the attachment of the pump or other suitable inflating means to any one of a plurality of inflating tubes employed upon a given boat or other inflatable container and so interconnected will uniformly inflate all of the several compartments comprising the structure.

Certain modifications may be made in the device of the present invention without in any way departing from the scope or spirit of the invention.

While in accordance with the patent statutes one best known embodiment of the invention has been illustrated and described in detail, it is to be particularly understood that the invention is not limited thereto or thereby, but that the inventive scope is defined in the appended claims.

I claim:

1. An inflating tube comprising a flexible stem portion having a passage of substantially uniform cross-sectional area extending therethrough, a mounting flange formed at one end of the stem portion having an opening therein registering with an end of the passage in the stem portion, an annular rim formed about said opening in the flange on the opposite face thereof to that on which the stem portion is disposed, a flattened portion in the stem portion substantially intermediate the ends thereof, a seating portion adjacent the end of the stem portion opposite the flange having a tapering internal wall, and a lip portion in the seating portion.

2. An inflating tube assembly comprising a tube molded from rubber and the like having a mounting flange on one face of which is integrally formed a bent hollow stem having a passage therethrough of substantially uniform cross-sectional area from end to end thereof, a flattened portion intermediate the ends of the stem defining a flex point therein, an outwardly flared portion adjacent the free end of the stem, and an inwardly projecting lip portion defining the outermost extremity of the flared portion, and a plug having a portion characterized by a surface contour of generally tapered configuration providing a seal with the internal surface of the flared portion and a groove thereon for engagement with the lip portion to secure the plug in place.

3. An inflating tube assembly comprising a tube molded from rubber and the like embodying a curved hollow stem adjacent one end of which is integrally formed a flange, an outwardly flared portion at the free end of the stem, a flattened portion intermediate the ends of the stem, and an inwardly projecting lip portion formed internally of the flared portion, and a plug embodying a butt portion of tapered configuration the progressive circumferential dimensions of which are slightly greater than the corresponding dimensions of the flared portion of the stem which receives the plug, a groove extending about the periphery of the plug adjacent the larger end of the butt portion for engagement with the lip portion in the flared portion of the stem, and a recess formed in the smaller end of the plug.

MARK J. STURTEVANT.

REFERENCES CITED

The following references are of record in the file of this patent:

UNITED STATES PATENTS

| Number | Name | Date |
|---|---|---|
| 1,552,298 | Harootunain | Sept. 19, 1925 |
| 1,624,102 | Kennedy | Apr. 12, 1927 |
| 1,683,322 | Annis | Sept. 4, 1928 |
| 2,040,356 | Butcher | May 12, 1936 |

FOREIGN PATENTS

| Number | Country | Date |
|---|---|---|
| 215,485 | Great Britain | May 15, 1924 |
| 291,394 | Great Britain | Dec. 6, 1928 |
| 500,643 | Great Britain | May 7, 1937 |